United States Patent [19]
Smith et al.

[11] Patent Number: 5,378,412
[45] Date of Patent: Jan. 3, 1995

[54] METHOD OF EDGING A CONTACT LENS OR LENS BLANK

[75] Inventors: David L. Smith, Rochester; Alan C. Wilson, Webster; Russell W. Harring, Rochester, all of N.Y.

[73] Assignee: Bausch & Lomb Incorporated, Rochester, N.Y.

[21] Appl. No.: 983,948

[22] Filed: Dec. 2, 1992

[51] Int. Cl.⁶ .................. B29C 37/02; B29D 11/00
[52] U.S. Cl. .................... 264/2.1; 264/2.7; 264/163
[58] Field of Search ............ 264/1.1, 1.4, 2.1, 2.7, 264/161, 162, 163, 310

[56] References Cited

U.S. PATENT DOCUMENTS

| | | | |
|---|---|---|---|
| 3,408,429 | 10/1968 | Wichterle | 264/2.1 |
| 3,423,886 | 1/1969 | Schpak et al. | 51/281 |
| 3,660,545 | 5/1972 | Wichterle | 264/2.1 |
| 3,832,920 | 9/1974 | Wrue | |
| 3,896,688 | 7/1975 | Wrue | |
| 4,113,224 | 9/1978 | Clark et al. | 249/105 |
| 4,165,158 | 8/1979 | Travnicek | 264/1.1 |
| 4,193,672 | 3/1980 | Trombley et al. | 351/160 |
| 4,197,266 | 4/1980 | Clark et al. | 264/25 |
| 4,239,353 | 12/1980 | Koller | 351/160 |
| 4,285,890 | 8/1981 | Mizutani | 264/1.1 |
| 4,534,723 | 8/1985 | Dillon et al. | 425/289 |
| 4,555,372 | 11/1985 | Kunzler et al. | 264/2.1 |
| 4,563,565 | 1/1986 | Kampfer et al. | 264/1.4 |
| 4,578,230 | 3/1986 | Neefe | 264/2.1 |
| 4,584,148 | 4/1986 | Rawlings et al. | 264/2.1 |
| 4,642,439 | 2/1987 | Miller et al. | 264/1.4 |
| 4,647,261 | 3/1987 | Schaffner | |
| 4,681,295 | 7/1987 | Haardt et al. | 264/1.1 |

FOREIGN PATENT DOCUMENTS

| | | |
|---|---|---|
| 0145516 | 6/1985 | European Pat. Off. |
| 0152330 | 8/1985 | European Pat. Off. |
| 0359084 | 3/1990 | European Pat. Off. |
| 2546692 | 4/1977 | Germany |

*Primary Examiner*—Mathieu D. Vargot
*Attorney, Agent, or Firm*—John E. Thomas

[57] ABSTRACT

A method of edging a contact lens secured in a mold member includes removing a peripheral edge section of the contact lens by circumferentially cutting the edge thereof at an angle less than 90° of the central axis of the mold member.

20 Claims, 3 Drawing Sheets

METHOD OF EDGING A CONTACT LENS OR LENS BLANK

BACKGROUND OF THE INVENTION

This invention relates to an improved method of edging a contact lens or lens blank. Additionally, the invention provides a method for producing a contact lens having a desired edge profile.

Various processes are known for curing a monomeric mixture in the production of contact lenses, including spincasting and static casting. Spincasting methods are disclosed in U.S. Pat. Nos. 3,408,429 (Wichterle) and 3,660,545 (Wichterle), and static casting methods are disclosed in U.S. Pat. Nos. 4,113,224 (Clark et al.) and 4,197,266 (Clark et al.). In spincasting processes, the monomeric mixture is charged to a mold member having a concave molding cavity for forming the anterior lens surface, and the posterior lens surface is formed from rotation of the mold. In static casting processes, a monomeric mixture is cured between a first mold member including a concave molding cavity for forming the anterior lens surface and a second mold member including a convex molding cavity for forming the posterior lens surface. An additional method, disclosed in U.S. Pat. No. 4,555,732 (Kunzler et al.), involves curing an excess of a monomeric mixture in a concave anterior mold member by spincasting to form a lens blank having an anterior lens surface and a relatively large thickness, followed by lathe cutting the posterior surface of the lens blank to obtain a contact lens having a desired thickness and posterior lens surface.

Often, it is desirable, or necessary, to machine the edge of a cast contact lens in order to provide a contact lens more suitable for placement on the eye. For example, it may be desirable to modify the edge profile so that the resultant contact lens has an edge which is less irritating to the eye, or it may be necessary to remove excess flash at the edge of the cast article.

FIG. 1 schematically illustrates a contact lens 1 which has been cast in mold member 2, such as by a conventional spincasting process. Mold member 2 includes: a support, which for this mold embodiment is cylindrical shell 3; concave molding cavity 4 having a central axis 5; and right cylinder wall 6 (i.e., a cylindrical wall at the periphery of the molding cavity which is normal to planar surface 7). As seen more clearly in FIG. 2, a sectional enlargement of FIG. 1 (noting, however, that the figures are not drawn to scale in order to illustrate better the edge profiles, e.g.), the spincast lens 1 has edge 8. Usually, however, this edge will actually have a more irregular shape; for example, edge 8 may include flash formed from the casting operation. In such a case, the lens would be even less suitable for placement on the eye.

Conventional methods for edging contact lenses include trimming the lens edge by cutting away a peripheral portion of the lens edge along with an adjacent section of the mold member while the lens remains secured in the anterior mold member. Such methods are disclosed in U.S. Pat. Nos. 3,832,920 (Wrue), 3,896,688 (Wrue), 4,534,723 (Dillon et al.) and 4,584,148 (Rawlings et al.).

Such conventional methods are illustrated representatively in FIG. 3, wherein the peripheral sections of the lens edge and the mold member which were removed from the assembly of FIG. 2 are indicated by dashed line 9. More specifically, the lens edge is circumferentially cut with a knife edge along line 10, wherein the knife edge is positioned at 90° with respect to the central axis of the mold member. Such a procedure is further illustrated in FIG. 4 of U.S. Pat. Nos. 3,832,920 and 3,896,688, and FIGS. 1 and 7 of U.S. Pat. Nos. 4,534,723 and 4,584,148.

As a refinement of these methods, it is known to round the posterior edge juncture 12 (FIG. 3) formed from this knife cutting, such as by mechanical buffing or polishing, in order to reduce the sharpness at this juncture. Accordingly, the lens edge assumes a shape as representatively shown in FIG. 4.

Nonetheless, it has been found that the conventional methods do not always provide a contact lens which is suitable for placement on the eye. For example, contact lenses produced by the conventional methods may cause irritation to the eye such as unacceptable levels of conjunctival staining.

SUMMARY OF THE INVENTION

In a first aspect, this invention provides an improved method of edging a contact lens or lens blank secured in a mold member. The method comprises:
(a) providing an assembly which comprises:
(i) a mold member comprising a concave molding cavity and a generally cylindrical wall at the periphery of the molding cavity, and
(ii) a contact lens or lens blank cast in said mold which comprises an anterior surface in contact with the molding cavity of the mold member, a posterior exposed surface, and an edge surface in contact with the generally cylindrical wall of the mold member; and
(b) removing a peripheral edge section of said contact lens or lens blank by circumferentially cutting the edge thereof at a rotational angle less than 90° of the central axis of the mold member.

In another aspect, the invention provides a method of producing a contact lens having a desired edge profile. The method comprises:
(a) casting a contact lens in a mold member comprising a concave molding cavity and a generally cylindrical wall at the periphery of the molding cavity, wherein the cast contact lens comprises an anterior surface in contact with the molding cavity of the mold member, an exposed posterior surface, and an edge surface in contact with the generally cylindrical wall of the mold member; and
(b) removing a peripheral edge section of the contact lens while secured in the mold member by circumferentially cutting the edge of the contact lens at a rotational angle less than 90° of the central axis of the mold member.

BRIEF DESCRIPTION OF THE DRAWING FIGURES

Figure 3:
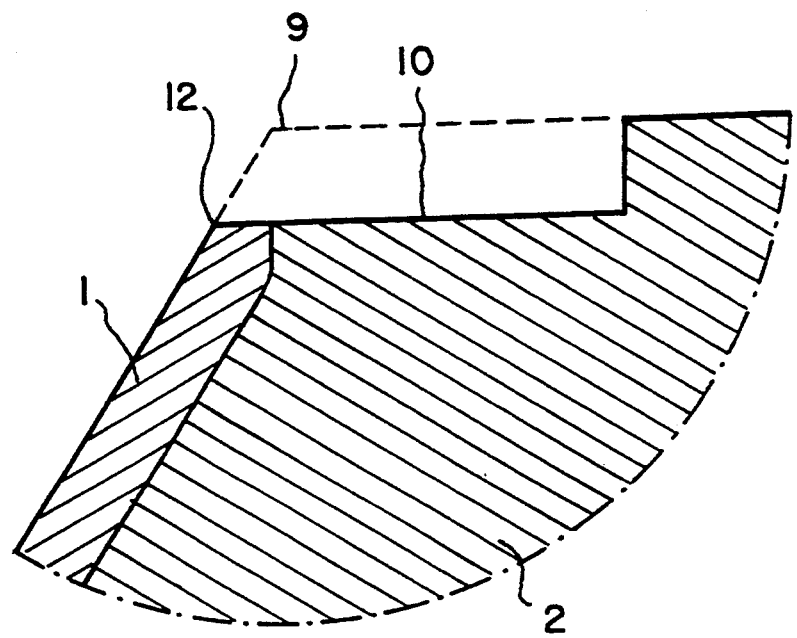
Figure 4:
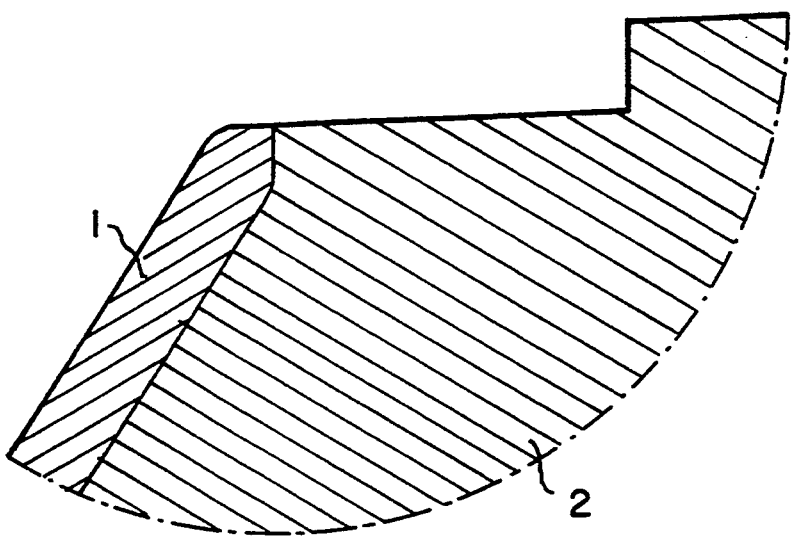

FIGS. 3 and 4 schematically illustrate contact lens edge profiles according to prior art methods of edging a contact lens.

Figure 5:
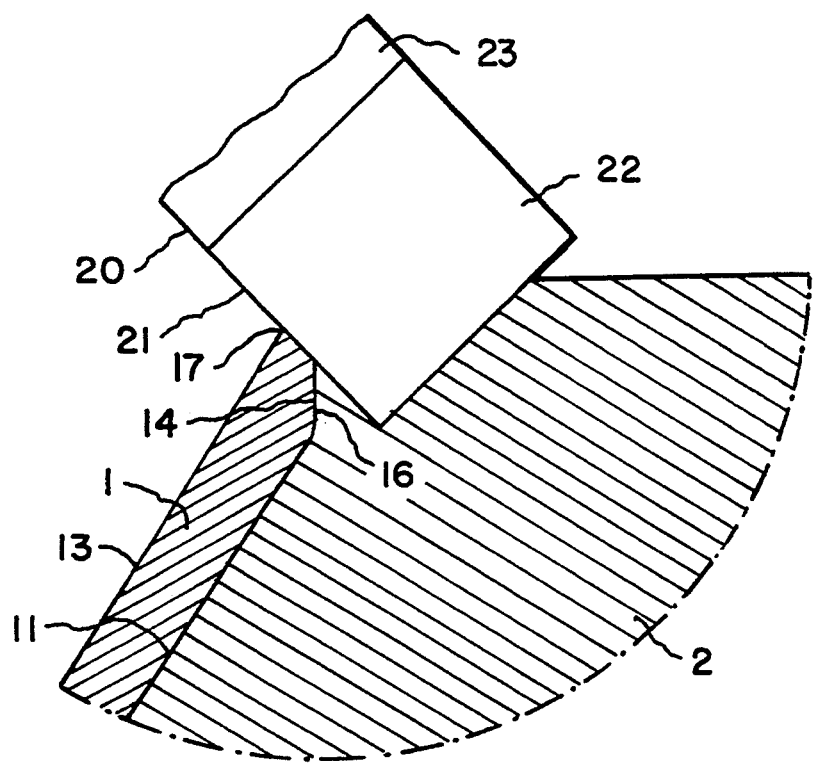
Figure 6:
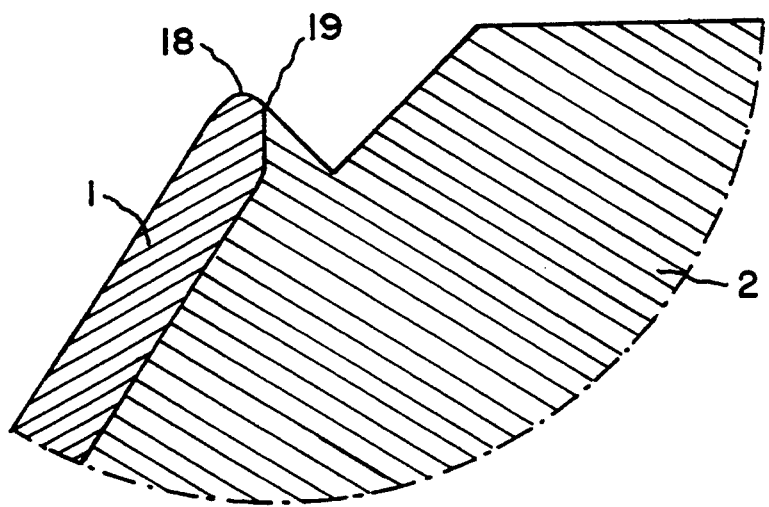

FIGS. 5 and 6 schematically illustrate contact lens edge profiles according to preferred embodiments of this invention.

DETAILED DESCRIPTION OF THE INVENTION

The methods of this invention involve edging a contact lens while the lens remains in the anterior mold member from which the lens was cast. The lens is cured in the mold member according to known methods, including spincasting, static casting, or spincasting followed by lathing a posterior surface. A suitable contact lens 1 and mold 2 assembly is shown in the figures.

The mold member comprises: a support, shown in the figures as cylindrical shell 3; an open concave molding cavity 4 which has central axis 5; and a generally cylindrical wall 6 at the periphery of molding cavity. Wall 6 generally has a height of 30 to 300 μm (0.030 to 0.3 mm), and such a wall is generally included on spincast molds to prevent monomer from escaping due to centrifugal forces resulting from rotation of the mold. According to preferred embodiments, wall 6 is cylindrical (i.e., a right cylinder wall) although it is understood that the term "generally cylindrical wall" includes other mold designs having peripheral walls which deviate from a cylindrical shape, such as walls which are frustoconical in shape. Contact lens 1 includes: anterior surface 11, in contact with mold cavity 4; edge surface 14, in contact with generally cylindrical wall 6; and exposed posterior surface 13.

While the embodiment shown in the figures illustrates primarily a spincast contact lens, the methods of this invention may be employed for lenses static cast in a similar anterior mold member. For example, the methods are applicable for contact lenses static cast in an anterior mold member which includes a generally cylindrical wall, wherein the posterior mold member is separated from the contact lens and anterior mold member assembly in order to expose the posterior surface of the contact lens.

Figure 1:
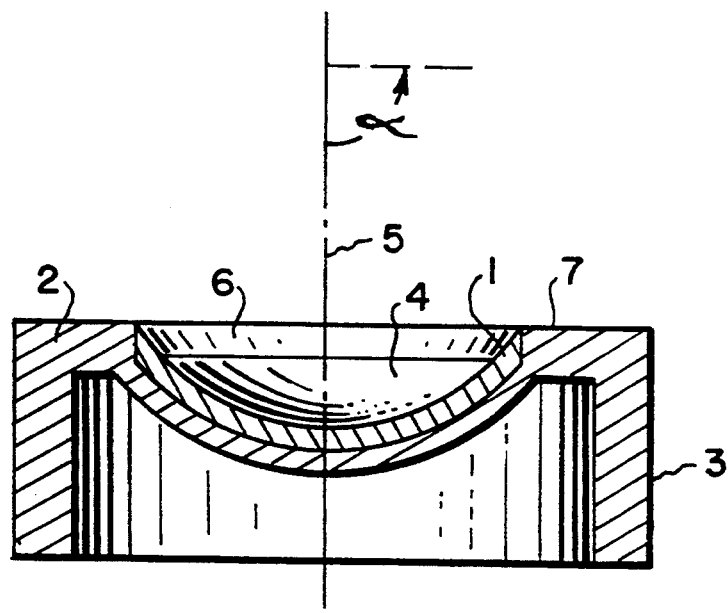
FIG. 1 is a cross-sectional schematic view of a contact lens and anterior mold member assembly.

As previously discussed, conventional methods of trimming a lens edge involve cutting away a peripheral portion of the lens edge along with an adjacent section of the mold member, as representatively shown in FIG. 3. It will be appreciated that in the conventional methods, the lens edge is removed by cutting with a knife edge positioned at 90° with respect to the central axis of the mold member, i.e., the mold assembly or a cutter is rotated while the knife edge of the cutter is positioned such that reference angle α in FIG. 1 is 90°.

In contrast to the conventional methods, the methods of the present invention involve removing a peripheral edge section of the lens by circumferentially cutting the edge at a rotational angle less than 90° of central axis 5, i.e., at a rotational angle wherein reference angle α is less than 90°. It has been found that by cutting the lens edge at this offset angle, the resultant contact lenses have a more desirable edge profile and are less irritating to the eye. While not wishing to be bound by theory, it appears that any edge junctures on the finished contact lens are located so as to be less likely to contact and irritate the eye.

The knife edging operation of the present invention is illustrated in FIG. 5, wherein cutter member 20 includes an angled knife edge 21 for cutting lens 1. As shown in the illustrated embodiment, knife edge 21 is formed on a diamond tip 22 mounted on a metal support 23. In order to effect the cutting, mold member 2 and lens 1 secured therein are rotated about central axis 5 while the cutting means remains stationary, wherein knife edge 21 makes the circumferential cut at a rotational angle less than 90° of the central axis. (Alternately, cutter member 20 may be rotated with respect to the mold assembly about the central axis of the assembly.) As shown in FIG. 5, the cutter member has completed the circumferential cut where knife edge 21 was angled at a rotational angle of 45° with respect to central axis 5.

According to preferred embodiments, the peripheral edge section of the contact lens, and preferably the adjacent section of the mold member as well, are removed by cutting at a rotational angle corresponding to reference angle α within 15° to 75°. Additionally, it is preferred that the circumferential cut intersects posterior surface 13 and edge surface 14 of the lens, as illustrated in FIG. 5. Circumferential cuts within these parameters further ensure that any edge junctures on the finished lens, such as edge juncture 19 (FIG. 6), are located so as to be non-irritating to the eye. According to more preferred embodiments, the rotational angle is within 30° to 60° of central axis 5, and the cutting operation results in removal of at least half the height of edge surface 14, as well as at least half of generally cylindrical wall 6 of the mold member in contact with edge surface 14.

As shown in FIG. 5, the angled knife cut results in posterior edge juncture 17. Preferably, this edge juncture is rounded by conventional machining techniques such as mechanical buffing or polishing, so that the finished lens has a rounded posterior edge 18, as illustrated in FIG. 6. Another advantage of the methods of this invention is that the angled knife cut facilitates rounding of the resultant posterior edge juncture.

The above-described preferred embodiments relate primarily to edging contact lenses molded in an anterior mold member having a generally cylindrical wall at the periphery of its molding cavity, including contact lenses produced by conventional methods such as spincasting, static casting, or spincasting followed by lathing of the posterior surface. Additionally, the methods of this invention may be employed to edge a lens blank. As used herein, the term "lens blank" denotes an article having a desired anterior lens surface and an exposed posterior surface, wherein the exposed posterior surface requires further machining, such as lathe cutting, to form a contact lens. As an example, the edging operation of this invention may be performed prior to, or concurrently with, lathe cutting the exposed surface of a contact lens blank, such as the lathe cutting of a lens blank posterior surface described in U.S. Pat. No. 4,555,372, the disclosure of which is incorporated herein by reference.

The following examples further illustrate preferred embodiments of the present invention.

Casting Contact Lenses

Under an inert nitrogen atmosphere, 25-μl samples of a monomeric mixture were injected onto clean, open anterior molds having a 200-μm (0.200 mm) right cylinder wall (RCW) and made of Barex resin (a rubber modified copolymer of acrylonitrile and methyl acrylate). The mixture contained: tris(trimethylsiloxy)silylpropyl vinyl carbamate (55 parts by weight); N-vinyl pyrrolidone (30 parts by weight); a silicone-containing vinyl carbonate represented by the formula

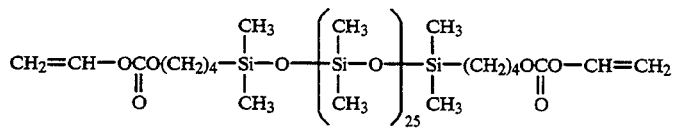

Figure 2:
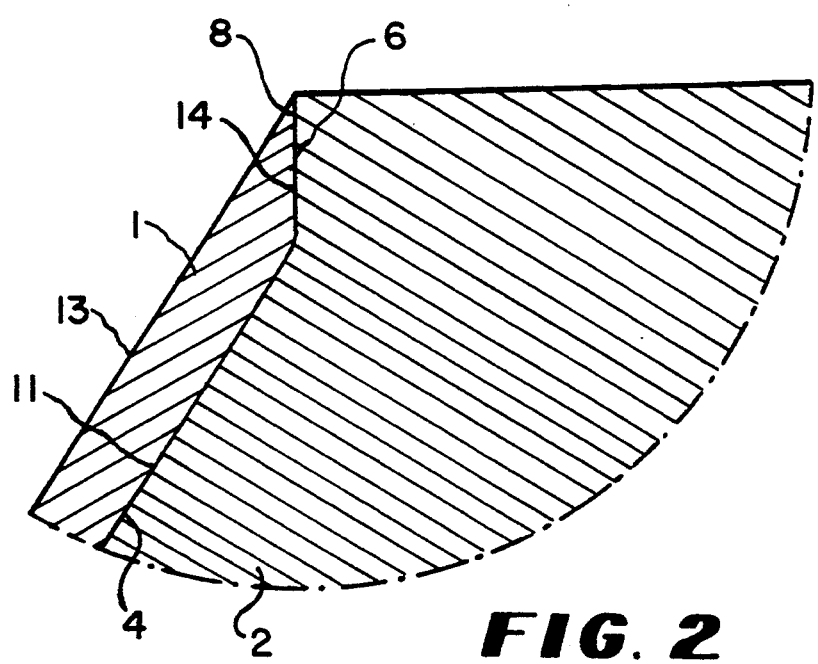
FIG. 2 is a sectional view of the assembly of FIG. 1.

(15 parts by weight); an organic diluent (15 parts by weight); a wetting agent (1 part by weight); and a UV initiator (0.3 parts by weight). The molds were spun in a spincasting machine and exposed to UV light to cure the monomeric mixture. Subsequently, the lenses were dried to remove excess diluent. The resultant lenses had a sharp edge, similar to the schematic representation of FIG. 2.

EXAMPLE 1

Edging Process of the Invention

Contact lenses, obtained by the previous procedure, were edged while remaining in the anterior mold by the following procedure. A peripheral edge section of the lenses, along with the adjacent section of the mold member, were removed by rotating the mold and lens assembly with respect to a cutter member having a diamond tip. The circumferential cut reduced the height of the RCW to about 100 μm (0.100 mm), and the knife edge of the tip was oriented at a rotational angle of 45° with respect to the central axis of the mold, so as to obtain a circumferential cut as illustrated schematically in FIG. 5.

Subsequently, the edges were mechanically buffed while still in the mold so as to round posterior juncture 17 (FIG. 5). The resultant contact lenses had an edge profile as shown schematically in FIG. 6. Subsequently, the finished lenses were manually released from the molds in water, extracted in alcohol and equilibrated with water. Finally, the lenses were thermally disinfected in buffered saline prior to on-eye examination.

COMPARATIVE EXAMPLE 1

Conventional Edging Process

Contact lenses, obtained by the previous procedure, were edged while remaining in the anterior mold by the following procedure. A peripheral edge section of the lenses, along with the adjacent section of the mold member, were removed by circumferentially cutting the lens and mold member with a rotating cutter member having a diamond tip. The circumferential cut reduced the height of the RCW to about 100 μm (0.100 mm), and the knife edge was oriented at a rotational angle of 90° with respect to the central axis of the mold, so as to obtain a circumferential cut as shown schematically in FIG. 3.

Subsequently, the edges were mechanically buffed while still in the mold so as to round the posterior edge juncture resulting from the knife cut, and the resultant contact lenses had an edge profile as shown schematically in FIG. 4. Subsequently, the finished lenses were released from the molds, extracted and disinfected following the procedure of Example 1.

EXAMPLE 2

Clinical Evaluation

The lot of contact lenses from Example 1 (designated hereinafter as Test Lenses) and the lot of contact lenses from Comparative Example 1 (designated hereinafter as Comparative Lenses) were tested in an on-eye clinical evaluation. Nine subjects each wore a Test Lens on one eye and a Comparative Lens on the other eye for about four hours.

It was determined that severity of conjunctival staining and extent of conjunctival staining were statistically significantly less for the Test Lenses than the Comparative Lenses at the end of the four-hour wearing period. Additionally, lesser lens movement was observed for the Comparative Lenses. The results are summarized in Table 1 for the Test lenses and in Table 2 for the Comparative Lenses.

For the data reported in Tables 1 and 2, severity of conjunctival staining was evaluated after about four hours, and rated on a scale of 0 to 4 (with 4 indicating greatest severity of staining), by the attending clinician. The extent of conjunctival staining was rated by estimating the extent of conjunctival insult around the conjunctiva in clock-hours (0 to 12).

TABLE 1

| | Test Lenses N = 9 | | | |
|---|---|---|---|---|
| | Mean | Std. Dev. | Min. | Max. |
| Conjunctival Staining (Severity) (Scale 0 to 4) | 1.1 | 0.6 | 0 | 2 |
| Conjunctival Staining (Extent) (Clock Hours) | 3.3 | 2.5 | 0 | 9 |
| Movement (mm) | 0.4 | 0.2 | 0.1 | 0.6 |

TABLE 2

| | Comparative Lenses N = 9 | | | |
|---|---|---|---|---|
| | Mean | Std. Dev. | Min. | Max. |
| Conjunctival Staining (Severity) (Scale 0 to 4) | 2.7 | 0.5 | 2 | 3 |
| Conjunctival Staining (Extent) (Clock Hours) | 10.4 | 2.9 | 3 | 12 |
| Movement (mm) | 0.2 | 0.2 | 0 | 0.6 |

While certain preferred embodiments have been described, it is understood that the invention is not limited thereto and modifications and variations would be evident to a person of ordinary skill in the art.

We claim:

1. A method of edging a contact lens or lens blank secured in a mold member, said method comprising:
    (a) providing an assembly which comprises:
        (i) an anterior mold member comprising a concave molding cavity and a generally cylindrical wall at the periphery of the molding cavity, and
        (ii) a contact lens or lens blank cast in said mold which comprises an anterior surface in contact with the molding cavity of the mold member, a posterior exposed surface, and an edge surface in contact with the generally cylindrical wall of the mold member; and
    (b) removing a peripheral edge section of said contact lens or lens blank by circumferentially cutting the edge thereof at a rotational angle less than 90° of a central axis of the mold member.

2. The method according to claim 1, wherein the rotational angle of the circumferential cut is within 15° to 75° of the central axis of the mold member.

3. The method according to claim 2, wherein the circumferential cut intersects the posterior surface and the edge surface of the contact lens or lens blank.

4. The method according to claim 3, wherein the circumferential cut reduces a height of the edge surface by at least half.

5. The method according to claim 3, wherein the circumferential cut removes a portion of the mold member adjacent the removed peripheral edge section of the contact lens or lens blank.

6. The method according to claim 5, wherein the circumferential cut intersects the posterior surface and the edge surface of the contact lens or lens blank and removes at least half the generally cylindrical wall of the mold member.

7. The method according to claim 3, wherein the rotational angle of the circumferential cut is within 30° to 60° of the central axis of the mold member.

8. The method according to claim 7, wherein the rotational angle of the circumferential cut is about 45° with respect to the central axis of the mold member.

9. The method according to claim 3, further comprising (c) rounding a juncture of the contact lens or lens blank at the posterior surface and an exposed cut surface thereof resulting from the circumferential cut.

10. A method of producing a contact lens having a desired edge profile comprising:
   (a) casting a contact lens in an anterior mold member comprising a concave molding cavity and a generally cylindrical wall at the periphery of the molding cavity, wherein said contact lens comprises an anterior surface in contact with the molding cavity of the mold member, an exposed posterior surface, and an edge surface in contact with the generally cylindrical wall of the mold member; and
   (b) removing a peripheral edge section of said contact lens while secured in said mold member by circumferentially cutting the edge of the contact lens at a rotational angle less than 90° of a central axis of the mold member.

11. The method according to claim 10, wherein the rotational angle of the circumferential cut is within 15° to 75° of the central axis of the mold member.

12. The method according to claim 11, wherein the circumferential cut intersects the posterior surface and the edge surface of the contact lens.

13. The method according to claim 12, wherein the circumferential cut removes a portion of the mold member adjacent the removed peripheral edge section of the contact lens.

14. The method according to claim 13, wherein the circumferential cut intersects the posterior surface and the edge surface of the contact lens and removes at least half the generally cylindrical wall of the mold member.

15. The method according to claim 12, wherein the rotational angle of the circumferential cut is within 30° to 60° of the central axis of the mold member.

16. The method according to claim 15, wherein the rotational angle of the circumferential cut is about 45° with respect to the central axis of the mold member.

17. The method according to claim 14, further comprising (c) rounding a juncture of the contact lens at the posterior surface and an exposed cut surface thereof resulting from the circumferential cut.

18. The method according to claim 10, wherein the contact lens is centrifugally cast in the mold member.

19. The method according to claim 10, wherein the contact lens is static cast in the mold member.

20. In a method of providing a desired edge profile to a contact lens or lens blank which comprises removing a peripheral edge section of said contact lens or lens blank while secured in an anterior mold member, wherein the mold member comprises a concave molding cavity and a generally cylindrical wall at the periphery of the molding cavity, and the contact lens or lens blank comprises a convex surface in contact with the concave molding cavity of the mold, an opposite exposed surface, and an edge surface in contact with the generally cylindrical wall of the mold, the improvement comprising:
   removing the peripheral edge section of said contact lens or lens blank by circumferentially cutting the periphery of the contact lens or lens blank at a rotational angle less than 90° of a central axis of the mold member.

* * * * *